United States Patent
Veracini et al.

(10) Patent No.: US 10,705,507 B2
(45) Date of Patent: Jul. 7, 2020

(54) METHOD FOR GENERATING A MACHINING PROGRAM AND MACHINE TOOL

(71) Applicant: Nuovo Pignone Srl, Florence (IT)

(72) Inventors: Massimo Veracini, Florence (IT); Massimo Guerrini, Florence (IT); Francescosaverio Chiari, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 0 days.

(21) Appl. No.: 15/524,849

(22) PCT Filed: Nov. 4, 2015

(86) PCT No.: PCT/EP2015/075741
§ 371 (c)(1),
(2) Date: May 5, 2017

(87) PCT Pub. No.: WO2016/071414
PCT Pub. Date: May 12, 2016

(65) Prior Publication Data
US 2017/0322544 A1 Nov. 9, 2017

(30) Foreign Application Priority Data
Nov. 7, 2014 (IT) .......................... MI2014A001925

(51) Int. Cl.
*G05B 19/4093* (2006.01)
*B23C 3/00* (2006.01)

(52) U.S. Cl.
CPC .......... *G05B 19/40937* (2013.01); *B23C 3/00* (2013.01); *B23C 2220/56* (2013.01);
(Continued)

(58) Field of Classification Search
CPC . B23C 3/00; B23C 2220/56; G05B 19/40937; G05B 2219/36308;
(Continued)

(56) References Cited

U.S. PATENT DOCUMENTS 3,571,834 A * 3/1971 Mathias ................. B23Q 15/12
408/9
4,090,240 A * 5/1978 Blanchard .......... G05B 19/4202
318/568.1
(Continued)

FOREIGN PATENT DOCUMENTS

CN 101767218 A 7/2010
JP 2008126377 A 6/2008
(Continued)

OTHER PUBLICATIONS

Sellmann, F., et al., "Improvement of the dynaniic behavior of machine tools by geometrical optimization of the machine tool axes movement," Institute of Machine Tools and Mrumfacturing, pp. 1-6 (2012).

(Continued)

*Primary Examiner* — Jennifer L Norton
(74) *Attorney, Agent, or Firm* — Baker Hughes Patent Operation

(57) ABSTRACT

Method for generating a machining program of a plunge mulling machine tool, comprising the steps of: establishing a machining to be performed on a workpiece; acquiring first machining information that indicates stable cut conditions of the machine tool for the workpiece; acquiring second machining information that indicates engagement cut conditions of the machine tool during the machining on the workpiece; carrying out a determination of the rotation speeds of the machine tool during the machining on the basis of the second machining information and the first machining information; wherein the machining program is generated on the basis of the determination carried out.

5 Claims, 4 Drawing Sheets

(52) U.S. Cl.
CPC ......... *G05B 2219/36308* (2013.01); *G05B 2219/45145* (2013.01); *G05B 2219/49093* (2013.01); *Y02P 90/265* (2015.11)

(58) Field of Classification Search
CPC .......... G05B 2219/45145; G05B 2219/49093; Y02P 90/265
See application file for complete search history.

(56) References Cited

U.S. PATENT DOCUMENTS

| | | | | |
|---|---|---|---|---|
| 4,096,770 | A * | 6/1978 | Tanner | G05B 19/186 318/571 |
| 4,250,775 | A * | 2/1981 | Jerue | B23B 29/03446 82/1.11 |
| 4,636,938 | A * | 1/1987 | Broome | G05B 19/4097 700/180 |
| 4,790,698 | A * | 12/1988 | Heffron | B23D 37/005 409/199 |
| 4,954,022 | A * | 9/1990 | Underwood | B23B 35/00 408/1 R |
| 4,979,121 | A * | 12/1990 | Inoue | B23B 3/06 700/194 |
| 5,140,237 | A * | 8/1992 | Sasaki | G05B 19/40937 318/568.11 |
| 5,406,494 | A * | 4/1995 | Schuett | G05B 19/41 318/569 |
| 5,493,193 | A * | 2/1996 | Seki | G05B 19/40932 318/570 |
| 5,602,748 | A * | 2/1997 | Seki | G05B 19/4097 318/570 |
| 5,991,528 | A * | 11/1999 | Taylor | G05B 19/41865 700/95 |
| 6,004,489 | A * | 12/1999 | Huang | B21C 25/02 264/176.1 |
| 6,085,121 | A * | 7/2000 | Stern | B23Q 17/12 340/680 |
| 6,438,445 | B1 * | 8/2002 | Yoshida | G05B 19/40932 700/173 |
| 6,501,997 | B1 * | 12/2002 | Kakino | G05B 19/40937 318/568.1 |
| 6,597,968 | B2 * | 7/2003 | Matsumoto | G05B 19/4166 700/170 |
| 6,745,100 | B1 * | 6/2004 | Lermuzeaux | G05B 19/4097 700/159 |
| 6,748,300 | B2 * | 6/2004 | Sato | G05B 19/19 700/181 |
| 8,676,372 | B1 | 3/2014 | Bolin et al. | |
| 8,821,063 | B2 * | 9/2014 | Johnson | E01C 23/09 299/1.5 |
| 2002/0091460 | A1 | 7/2002 | Allen | |
| 2005/0246052 | A1 | 11/2005 | Coleman et al. | |
| 2007/0179661 | A1 | 8/2007 | Onozuka | |
| 2010/0292822 | A1 * | 11/2010 | Hahn | G05B 19/40937 700/98 |
| 2013/0345851 | A1 | 12/2013 | Kataoka et al. | |
| 2014/0297021 | A1 | 10/2014 | Aggarwal et al. | |
| 2015/0277436 | A1 * | 10/2015 | Kalmar-Nagy | G05B 19/40937 700/187 |
| 2016/0082545 | A1 * | 3/2016 | Kurokawa | B23K 26/00 700/166 |
| 2016/0187869 | A1 * | 6/2016 | Sherbrooke | G05B 19/40937 700/164 |
| 2016/0327938 | A1 * | 11/2016 | Kawai | G05B 19/40937 |
| 2017/0008107 | A1 * | 1/2017 | Wuerfel | G05B 19/186 |
| 2017/0220025 | A1 * | 8/2017 | Kawai | G05B 19/409 |
| 2018/0150060 | A1 * | 5/2018 | Hsu | G05B 19/40937 |

FOREIGN PATENT DOCUMENTS

| | | |
|---|---|---|
| JP | 2013027944 A | 2/2013 |
| JP | 2013039645 A | 2/2013 |

OTHER PUBLICATIONS

Tournier, C., et al., "5-axis High Speed Milling Optimisation," International Journal of Numerical Engineering, vol. 2, (1-2), pp. 173-184 (Apr. 7, 2009).

Italian Search Report and Written Opinion issued in connection with corresponding IT Application No. MI2014A001925 dated Jul. 2, 2015.

International Search Report and Written Opinion issued in connection with corresponding PCT Application No. PCT/EP2015/075741 dated Jan. 15, 2016.

International Preliminary Report on Patentability issued in connection with corresponding PCT Application No. PCT/EP2015/075741 dated May 9, 2017.

* cited by examiner

METHOD FOR GENERATING A MACHINING PROGRAM AND MACHINE TOOL

BACKGROUND

In the Oil & Gas industries, the continuous improvement in efficiency of machines like large turbo compressors is imperative. Design specifications of products like impellers are continuously updated to reach better performance and to improve durability.

Often, a design specification consists in the shape of portions of the final product, for example the shape of the vanes of an impeller. Also very often, the desired shape is achieved by machining of the workpiece.

Project requirements imply particular shapes, with tight tolerances. Consequently, machining requirements are very demanding.

Oil & Gas components are often machined through plunge milling. In plunge milling, as known, the machining is performed with a plurality of subsequent cylindrical milling operations. Such operations are carried out automatically under the control of an expert machinist. A control unit equips the machine tool, the machining program is loaded into the control unit for driving the spindle accordingly.

The number of workpieces to produce are significant, but not so large to justify other (much more expensive) manufacturing techniques. In this context, machinists are typically very skilled operators, their control is central to obtain a satisfying machining.

However, high requirements in machining prompted some research centers to develop software programs for determining the best conditions for perform the machining of a certain workpiece.

A first software program (some software programs of this kind are commercially available) provide stable cut conditions.

Such first software program receives as input the type of the material of the workpiece, the geometry of the machine tool, the engagement condition and the frequency response of the tool working on the workpiece. This information allows to calculate the work speed of the machine tool for machining the workpiece in stable conditions, to safeguard the workpiece and the tool itself. Typically, such information are integrated in the machining program. This first software program may provide machining information only if the engagement condition (in input) are steady during the machining of the workpiece.

But often the machining of a workpiece, in particular a workpiece for the Oil & Gas industry, requires different engagement conditions, due to the particular geometry of the workpiece and/or the shape of the machining.

A second software program (some software programs of this kind are commercially available) provides engagement conditions, to establish the feed of the machine tool. In practice, this software programs provides an array containing a plurality of engagement data of a plurality of corresponding points of the scheduled machining. In this way, a feed of the machine tool is assigned to each point of the scheduled machining. If the engagement data refer to steady engagement conditions during the machining, the stable cut conditions may be retrieved using the first software program. If the engagement data do not refer to steady engagement conditions during the machining (as it often happens), the stable cut conditions retrievable from the first software program are not reliable. In these cases, the work and the experience of the machinist is fundamental to understand the cut conditions during the machining. On the subjective basis of what he hears and sees during the machining of the workpiece, he corrects the speed of the machine tool to remain in the stable cut conditions.

SUMMARY

Therefore, there is a need for a method for generating a machining program overcoming problems of the prior art.

According to one exemplary embodiment, there is a method for generating a machining program of a machine tool comprising the steps of: A- establishing a machining to be performed on a workpiece; B- acquiring first machining information that indicates stable cut conditions of said machine tool for said workpiece; C- acquiring second machining information that indicates engagement cut conditions of said machine tool during said machining on said workpiece; D- carrying out a determination of the rotation speeds of said machine tool during said machining on the basis of said second machining information and said first machining information; wherein said machining program is generated on the basis of the determination carried out at the step D.

According to another exemplary embodiment, there is a computer program product to be loaded into and executed by a computer implementing the method described.

According to one exemplary embodiments, there is a machine tool comprising a tool part adapted to perform a machining on a workpiece, and a control part, connected to said tool part, comprising storing devices and a processing device, to store and execute the computer program product described to drive said tool part according to the machining program generated.

BRIEF DESCRIPTION OF THE DRAWINGS

Embodiments of the present invention will become more apparent from the following description of exemplary embodiments to be considered in conjunction with accompanying drawings wherein.

DETAILED DESCRIPTION

The following description of exemplary embodiments refer to the accompanying drawings. The same reference numbers in different drawings identify the same or similar elements. The following detailed description does not limit the present invention. Instead, the scope of the present invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
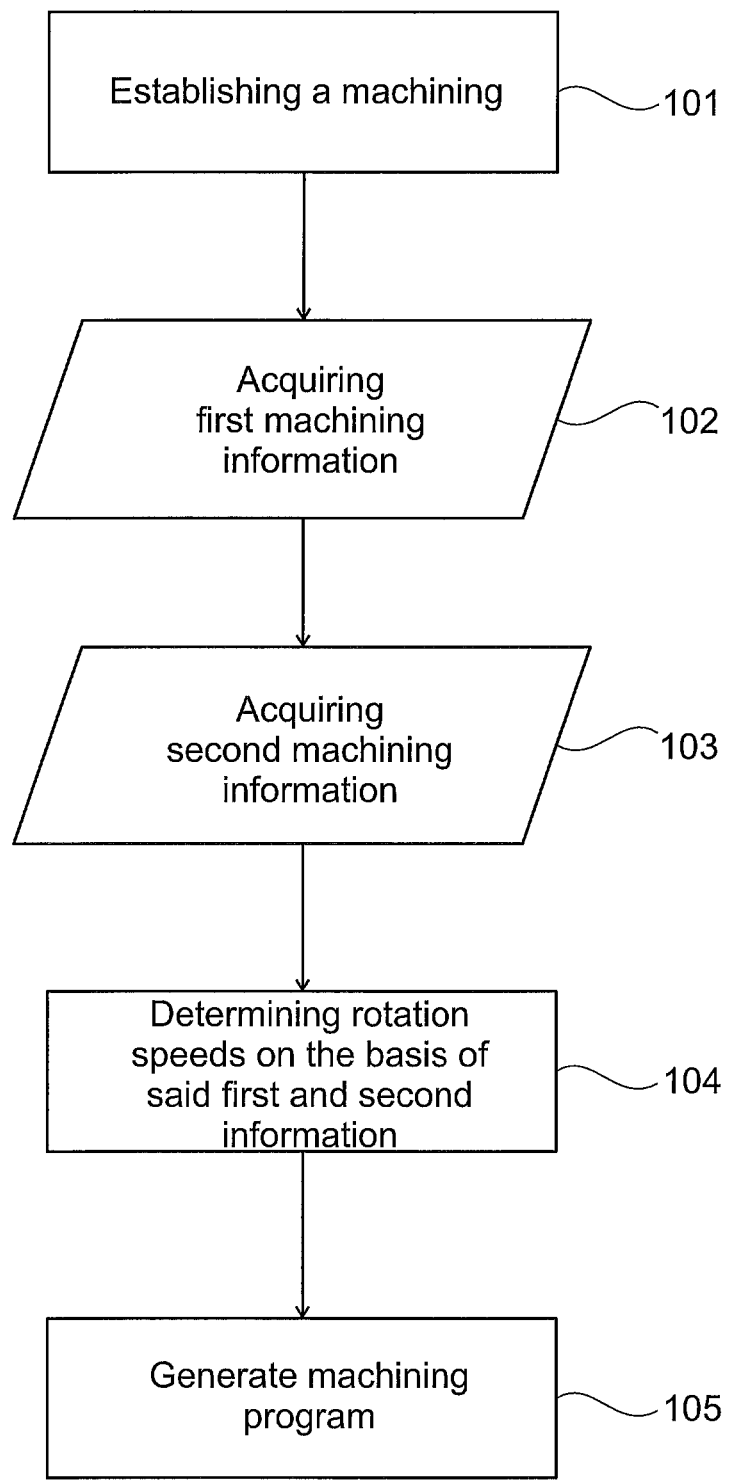
FIG. 1 shows a block diagram of operations aimed at carrying out an embodiment of the method for generating a machining program.

With reference to FIG. 1, is shown an embodiment of the method for generating a machining program of a plunge milling machine tool. It worth noting that the machine tool maybe adapted to carry out many type of milling, including plunge milling. Nevertheless, embodiments of the method are in particular taught for the plunge milling.

According to one embodiment, the method provides to establish a machining 15 to be performed on a workpiece, as shown in the box 101. In such operation, the machinist or the project designer establishes the machining to be performed on the workpiece, and is typically conducted via a computer program.

Once the machining is established, first machining information 20 are acquired, as shown in the box 102. Such first machining information 20 indicates stable cut conditions of the machine tool performing the machining on the workpiece 10. Typically, such information are acquired from a software specifically designed, that receives as input: the workpiece material, the geometry of the machine tool, the engagement condition and the frequency response of the tool working on the workpiece and gives as output the admissible rotation speeds of the machine tool (i.e. speed of rotation in which the cut is stable) for a plurality of engagement cut conditions. The information provided are known with the term stable cut conditions, in fact provide speed rotations of the machine tool in which the cut is stable. Such first machining information refer to the workpiece for which the machining is carried out. In another embodiment such information may be calculated (providing all input data necessary to carry out the calculus), instead of acquired as such from the software specifically designed.

As shown in the box 103, second machining information 30 are afterwards acquired. Such information indicates engagement cut conditions of the machine tool during the machining 15. In one embodiment such second machining information are a plurality of engagement data of the machine tool performing the machining. This information reflects the machining 15 established for the workpiece 10, and are typically generated by a software specifically designed (different from the one providing first machining information).

It is worth noting that the order according to which first machining information are acquired before second machining information may be inverted, and in one embodiment may such steps may be carried out concurrently.

Thus, in the step of the box 104, first and second machining information 20, 30 are acquired and, on the basis of such information, the rotation speeds of the machine tool during the machining 15 are determined. Embodiments of such determination are explained in detail below.

The box 105 represents the last step of the method for generating a machining program. In particular, the machining program is generated on the basis of the determination of the rotation speeds of the machine tool previously carried out. The machining program is adapted to be loaded into the control part of the machine tool, and is adapted to drive the tool part of the machine tool itself. Rotation speeds of the machine tool are only part of the information populating data of the machining program that is conceived to drive the machine tool in order to carry out the machining on the workpiece. In this sense, the step described in the box 105 may gather other information to properly create the machining program.

Figure 2:
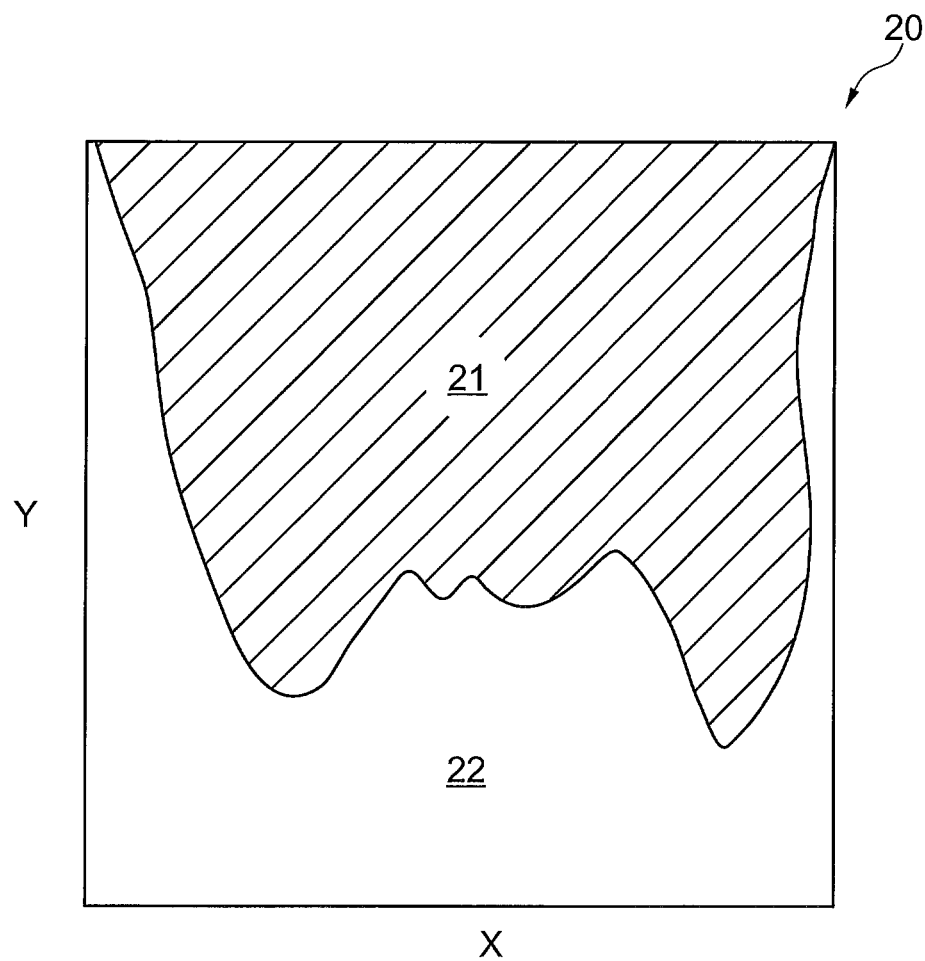
FIG. 2 shows a diagram of first information used in an embodiment of the method for generating a machining program.

With reference to FIG. 2, a diagram representing the first machining information 20 is shown. The X axis represents the rotation speeds of the machine tool, the Y axis represents the engagement cut conditions of the machine tool. As said, the first machining information 20 refer to the workpiece 10. As shown, the diagram is fundamentally divided in two regions: the unstable cut region 21 and the stable cut region 22.

In the unstable cut region 21, the machining of the workpiece 10 at a plurality of engagement cut conditions for a plurality of rotation speeds of the machine tool is unstable. Vice versa, in the stable cut region 22 the machining of the workpiece 10 at a plurality of engagement cut conditions for a plurality of rotation speeds of the machine tool is stable. The aim is to perform the machining in stable cut conditions, whilst the unstable cut conditions are to avoid. It worth noting that a certain engagement cut condition may correspond to a plurality of rotation speeds of the machine tool for which the cut is stable, as well as a certain engagement cut condition may correspond to a plurality of rotation speeds of the machine tool for which the cut is unstable. Such data are i.a. used to determine rotation speeds of the machine tool during the machining 15, as well be explained in detail below.

According to one embodiment, rotation speeds of the machine tool represented on the X axis is in routes per minute of the machine tool (in particular the spindle of the machine tool). Engagement cut conditions may be in various format. In general, engagement cut conditions describe the states of the machine tool and the operations it has to perform to carry out a machining. For example, the engagement cut conditions related to the machining of a workpiece may be represented from the following data: "at the position corresponding to 0 millimeter of the machining, a plunge of 5 mm of depth at an angle of 45 degrees" and "at the position corresponding to 1 millimeter of the machining, a plunge of 2 mm of depth at an angle of 65 degrees", and so on. Such data may be coded to be represented, for example, by a unique identifier. On the Y axis of the diagram of the first machining information 20 may thus be represented the unique identifier associated to a particular engagement condition.

Figure 3:
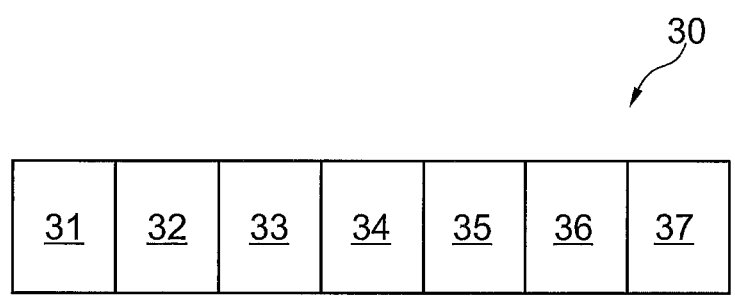
FIG. 3 shows a schematic view of second information used in an embodiment of the method for generating a machining program.

With reference to FIG. 3, is represented a schematic view of an embodiment of the data structure for storing the second machining information 30. According to this embodiment, the second machining information 30 comprise a plurality of engagement data of the machining established at the step A. It is worth noting that such engagement data specifically refer to the established machining 15 to be performed on the workpiece 10. The engagement data of the second machining information 30 may be stored in various form, for example according to the coding previously described.

The rotation speed of the machine tool is directly related to the material removal rate. According to one embodiment, the rotation speeds are in turn determined to maximize the material removal rate of the machining.

With reference to figures from 4 to 8 is shown an embodiment of method for generating a machining program to perform the machining 15 on the workpiece 10.

Figure 4:
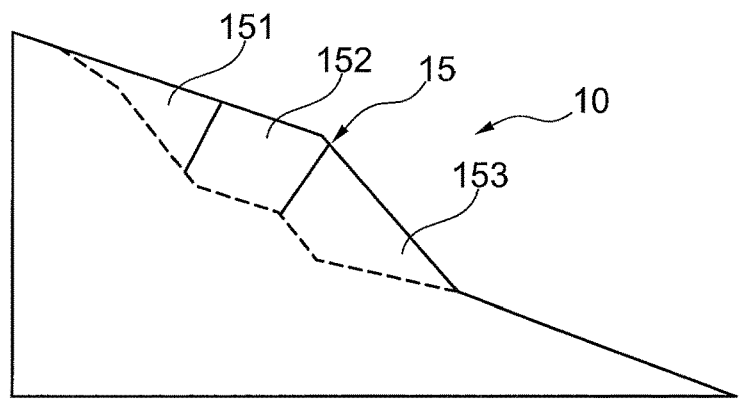
FIG. 4 shows a view of a workpiece for which a machining is programmed.

In FIG. 4, for the workpiece 10 a machining 15 is established. For simplicity, the machining 15 comprise three main machining portions: first machining portion 151, second machining portion 152 and third machining portion 153. As a further hypothesis, each machining portion has one engagement condition. Of course, in real cases the machining portions are much more. The three different engagements conditions of the three different machining portions are not steady.

Figure 5:
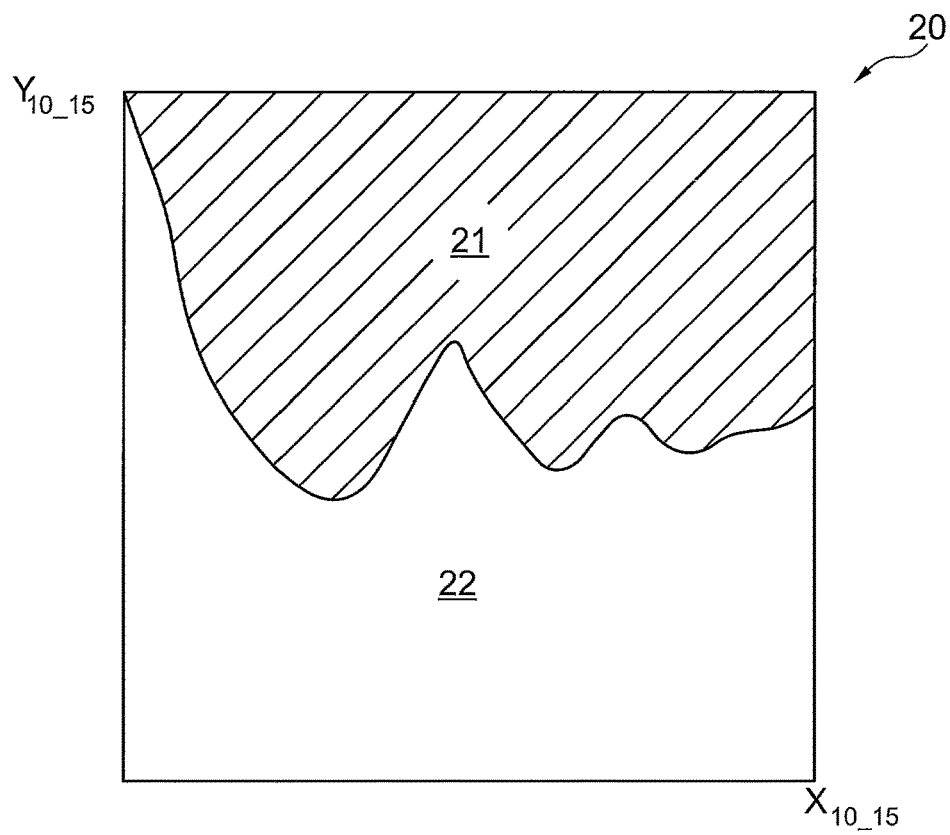
FIG. 5 shows a diagram of first information for the workpiece of FIG. 4.

FIG. 5 shows first machining information 20 of the workpiece 10 (of FIG. 4). Such second machining information 20 are specific for the workpiece 10, and represent the stable cut conditions for the workpiece 10. On the $Y_{10\_15}$ axis are represented the engagement conditions of the machine tool on the workpiece 10. On the $X_{10\_15}$ axis are represented the rotation speeds of the machine tool.

In the stable cut region 22, engagement cut conditions for the corresponding rotation speeds of the machine tool correspond to a stable cut of the workpiece. On the contrary, in the unstable cut region 21 the engagement cut conditions for the corresponding rotation speeds of the machine tool correspond to an unstable cut of the workpiece. On the $Y_{10\_15}$ axis a plurality of engagement conditions of the machine tool on the workpiece 10 are represented, but only the three engagement conditions Y1, Y2 and Y3 related respectively to the three portions 151, 152 and 153 of the machining 15 are of interest to generate the machining program for the workpiece 10.

Figure 6:
FIG. 6 shows a schematic view of second information for the workpiece of FIG. 4.

FIG. 6 shows third machining information 30 of the workpiece 10. According to an embodiment, third machining information are stored as an array of engagement data. The records $31_{151}$, $31_{152}$, $31_{153}$ of the array of engagement data represent the engagement conditions of the machine tool for the machining 15. In the embodiment shown, there are three records: the first record $31_{151}$ represents the first engagement condition 151, the second record $32_{152}$ represents the second engagement condition 152 and the third record $33_{153}$ represents the third engagement condition 153.

Figures 7, 8:
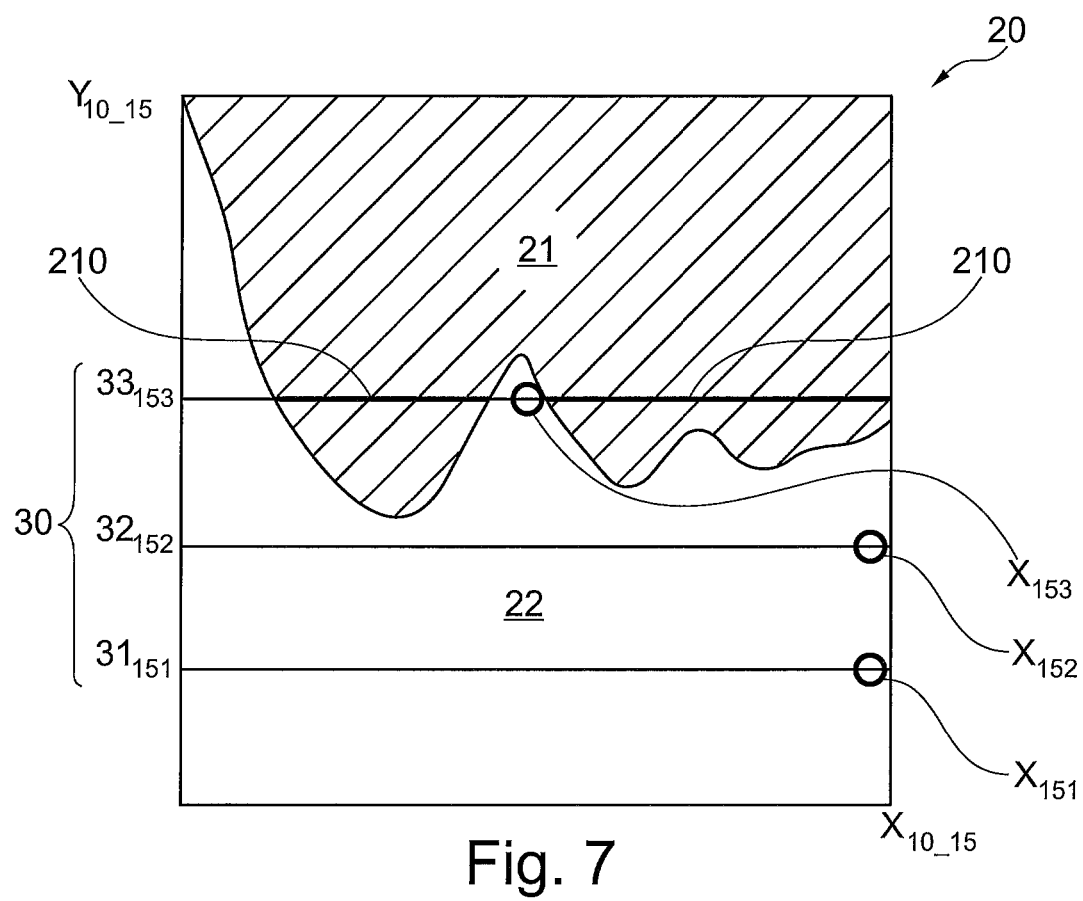
FIG. 7 shows a schematic view of a step of an embodiment of the method.
FIG. 8 shows a schematic view of another step of an embodiment of the method.

FIGS. 7 and 8 show a schematic representation of an embodiment of the step in which the determination of the rotation speeds of machine tool is carried out.

As said, this determination occurs on the basis of the second machining information 30 (in particular $31_{151}$, $31_{152}$, $31_{153}$) and the first machining information 20.

According to this embodiment, the determination is repeated for the portions that constitutes the whole machining. The first step is thus establishing the current portion of machining of the workpiece. This allows a determination of the rotation speed for that portion of machining. In the embodiment, it is established that the first portion of the machining of the workpiece 10 is the first portion 151. From the engagement data 30, the value of the engagement cut condition for the current portion of machining of the workpiece is retrieved. As noted, according to said embodiment, the portion(s) of machining 151, 152, 153 are related to the engagement data 30.

Thus, the engagement cut condition of the first machining portion 151 is stored in the first record $31_{151}$ of the engagement data 30.

The engagement cut condition for the first machining portion 151 is thus retrieved. As shown in FIG. 7, the next step is to control in the first machining information 20, the admissible(s) rotation speed for the first portion 151 of the machining. The engagement cut condition $31_{151}$ of the first machining portion 151 is in the stable region 22, thus according to one embodiment the rotation speed of the machine tool for the machining of the first portion 151 is set as the maximum speed admissible, corresponding to speed indicated as $X_{151}$.

The determination of the rotation speeds provide to repeat the previous step for the remaining portions of machining. In this embodiment, the next portion of machining is the second portion 152 for which the engagement cut condition is retrievable from the second record $32_{152}$ of the engagement data 30. Also in this case, the engagement cut condition $32_{152}$ of the second machining portion 152 is in the stable region 22, thus the rotation speed of the machine tool for the machining of the second portion 152 is set as the maximum speed admissible, corresponding to speed indicated as $X_{152}$.

The determination of the rotation speeds is repeated for the last portion of machining—the third machining portion 153—of the machining 15. The engagement cut condition $33_{153}$ of the third machining portion 153 comprises some rotation speeds in the unstable region 22. These speeds are indicated with the reference number 210, and are to avoid for the machining 15 of the workpiece 10. The speeds admissible for the machining of the third portion 153 are lower than the other two. The chosen one is the higher one (in terms of routes per minute); $X_{153}$.

Once the rotation speeds for the machining 15 has been established, the machining program may be generated. With reference to FIG. 8, are shown part of the data collected to generate such program, in particular the rotation speeds for the machining 15 of the workpiece 10. To the first machining portion 151, which corresponds the engagement cut condition $31_{151}$, the rotation speed $X_{151}$ is assigned. To the second machining portion 152, which corresponds the engagement cut condition $32_{152}$, the rotation speed $X_{152}$ is assigned. To the third machining portion 153, which corresponds the engagement cut condition $33_{153}$, the rotation speed $X_{153}$ is assigned. It worth noting that rotation speeds determined maximize the material removal rate, while performing the machining on the workpiece 10 in stable cut conditions.

According to an embodiment, the machining program is generated as a part program, is thus adapted to drive the plunge milling machine tool for performing the machining of the workpiece 10.

According to another embodiment, there is a computer program product adapted to be loaded into and executed by a computer, implementing the method previously described.

According, there is a machine tool comprising a tool part adapted to perform a machining on a workpiece, and a control part connected to the tool part comprising storing devices and a processing device, to store and execute the computer program product described, to drive the tool part according to the machining program generated.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for generating a machining program of a plunge milling machine tool, the method comprising:
    establishing a machining to be performed on a workpiece;
    acquiring first machining information corresponding to stable cutting conditions of the plunge milling machine tool for the workpiece;
    acquiring second machining information corresponding to engagement cutting data of the plunge milling machine tool during the machining of the workpiece;
    determining rotation speeds of the plunge milling machine tool occurring during the machining of two distinct portions of the workpiece based on the first machining information and the second machining information; and
    based on the determined rotation speeds, generating a machining program to set a maximum admissible rotational speed the plunge milling machine tool for each of the two distinct portions of the workpiece to maintain the stable cutting conditions during machining of the workpiece.

2. The method according to claim 1, wherein the set maximum admissible rotational speed of the plunge milling machine tool for each of the two distinct portions of the workpiece is further determined to maximize a material removal rate of the workpiece during machining.

3. The method according to claim 1, further comprising executing the method on a computer with a computer program.

4. A machining tool comprising:
    a tool part to machine a workpiece;
    a control part connected to the tool part and comprising a processing device configured to:
        establish a machining to be performed on a workpiece;
        acquire first machining information corresponding to stable cutting conditions of the tool part for the workpiece;
        acquire second machining information corresponding to engagement cutting data of the tool part during machining of the workpiece;
        determine rotation speeds of the tool part occurring during the machining of two distinct portions of the workpiece based on the machining information and the second machining information;
        based on the determined rotation speeds, generate a machining program to set a maximum admissible rotational speed the tool part for each of the two distinct portions of the workpiece to maintain the stable cutting conditions when machining the workpiece; and
        control the tool part to perform a machining on a workpiece according to the machining program generated.

5. The machine tool according to claim 4, wherein the set maximum admissible rotational speed of the tool part for each of the two distinct portions of the workpiece is, via the processing device, further determined to maximize a material removal rate of the workpiece during machining.

* * * * *